United States Patent
Chang et al.

(10) Patent No.: US 7,903,437 B2
(45) Date of Patent: Mar. 8, 2011

(54) FREQUENCY-CHANGING VOLTAGE REGULATION CIRCUIT

(75) Inventors: Yu-Yuan Chang, Taipei Hsien (TW);
Yi-Hua Wang, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 425 days.

(21) Appl. No.: 12/106,800

(22) Filed: Apr. 21, 2008

(65) Prior Publication Data
US 2009/0261789 A1   Oct. 22, 2009

(51) Int. Cl.
*H02M 7/00* (2006.01)
(52) U.S. Cl. .......................................... 363/60
(58) Field of Classification Search .................. 323/265, 323/273, 282, 284; 363/59, 60
See application file for complete search history.

(56) References Cited

U.S. PATENT DOCUMENTS

| 6,903,517 | B2 * | 6/2005 | Nakanishi et al. ....... 315/209 PZ |
| 7,755,584 | B2 * | 7/2010 | Senda et al. ..................... 345/87 |
| 2006/0176719 | A1 * | 8/2006 | Uruno et al. ..................... 363/89 |

* cited by examiner

*Primary Examiner* — Adolf Berhane
(74) *Attorney, Agent, or Firm* — Muncy, Geissler, Olds & Lowe, PLLC

(57) ABSTRACT

The present invention discloses a frequency-changing voltage regulation circuit, which applies to a power supply device that has a booster unit and a power conversion unit. The booster unit modulates an input power and converts the input power into a boosted power. The boost control circuit is coupled to the frequency-changing voltage regulation circuit of the present invention. The frequency-changing voltage regulation circuit comprises: a voltage detection circuit and a frequency setting circuit. The voltage detection circuit detects the input power sent to the booster unit and generates an input level signal according to the value of the input power. The frequency setting circuit generates a reference frequency signal corresponding to the input level signal and uses the reference frequency signal to modulate the frequency that the booster unit performs power conversion.

9 Claims, 4 Drawing Sheets

FREQUENCY-CHANGING VOLTAGE REGULATION CIRCUIT

FIELD OF THE INVENTION

The present invention relates to a frequency-changing voltage regulation circuit, wherein a frequency-changing technology and a voltage regulation technology are used to modulate the power input to a power supply device.

BACKGROUND OF THE INVENTION

Refer to FIG. 1. Most of power supply devices (including AC/DC and DC/DC converters) comprise: a rectifier filter unit 1, a booster unit 2 (including the conventional power factor correction units), and a switching type power conversion unit 3. An input power 8 is received by the power supply device from a power source, processed by the rectifier filter unit 1 and boosted by the booster unit 2 (including the conventional power factor correction units) to form a boosted power. Then, the boosted power is converted into an output power 9 by the power conversion unit 3 to drive at least one load. The booster unit 2 further comprises: a charge/discharge loop, a switch element, and a boost control circuit, wherein the boost control circuit can generate a driving signal to turn on the switch element. The boost control circuit adjusts the duty ratio (i.e. the width of the turn-on period of the driving signal) to control the turn-on interval of the switch element and then control the voltage of the charge/discharge loop. Thereby, the input power 8 is converted into the boosted power. In addition to adjusting the duty ratio, the conventional booster unit 2 may have a Continuous Current Mode (CCM) or a Discontinuous Current Mode (DCM). DCM is usually only used in small power supply devices, but CCM dominates power supply devices. Constrained by its working principle, CCM is a fixed-frequency method. In other words, the booster unit 2 uses a fixed-frequency driving signal to control the switch element and then control the current cycles of the charge/discharge loop, wherein the duty ratio is influenced by the load. However, the turn-on interval of the switch element must vary with the input current to a considerable extent so that the booster unit 2 (including the conventional power factor correction units) can provide a constant-voltage boosted power. For example, the voltage of the input power 8 may vary from 90V to 150V; thus, the turn-on interval of the switch element should be greatly prolonged to attain a boosted voltage of 290V so that the booster unit 2 can output a boosted voltage of 380V. Consequently, the switch element has to withstand very great current, and the switching loss is also very obvious. Besides, the influences of the harmonics and noise are also very obvious. Therefore, the conventional technology has much room to improve.

SUMMARY OF THE INVENTION

One objective of the present invention is to provide a frequency-changing voltage regulation circuit to overcome the problem of the conventional booster circuit: when the conventional boost circuit works in a continuous current mode, the switch element of the booster circuit has to adjust the turn-on interval in a great range and withstand a great current to maintain a fixed frequency, which causes obvious switching loss, harmonics and noise, and also results in a shorter lifetime and higher costs.

The present invention proposes a frequency-changing voltage regulation circuit, which applies to a power supply device that has a booster unit and a power conversion unit. The power supply device is coupled to a power source to obtain an input power. The booster unit has a boost control circuit and operates in a continuous current mode. The boost control circuit modulates the input power according to a reference frequency to converts the input power into a boosted power. The boost control circuit is coupled to the frequency-changing voltage regulation circuit of the present invention. In the present invention, the frequency-changing voltage regulation circuit comprises: a voltage detection circuit and a frequency setting circuit. The voltage detection circuit detects the input power sent to the booster unit and generates an input level signal according to the value of the input power. The frequency setting circuit generates a reference frequency signal corresponding to the input level signal and sends the reference frequency signal to the boost control circuit to modulate the frequency that the booster unit performs power conversion. The above-mentioned circuit architecture of the present invention can detect the level of the input power and make the booster unit work at different frequencies according to the level of the input power. Via changing the working frequency, the present invention makes the booster unit boost the input power to a specified level with less switching loss. Further, a lower frequency means fewer switching operations and longer turn-on intervals within a given length of time. Thereby, the burden of the booster unit is reduced, and the switching loss, harmonics and noise is decreased.

DETAILED DESCRIPTION OF THE PREFERRED EMBODIMENTS

Below, the technical contents of the present invention will be described in detail in cooperation with the drawings.

Figure 1:
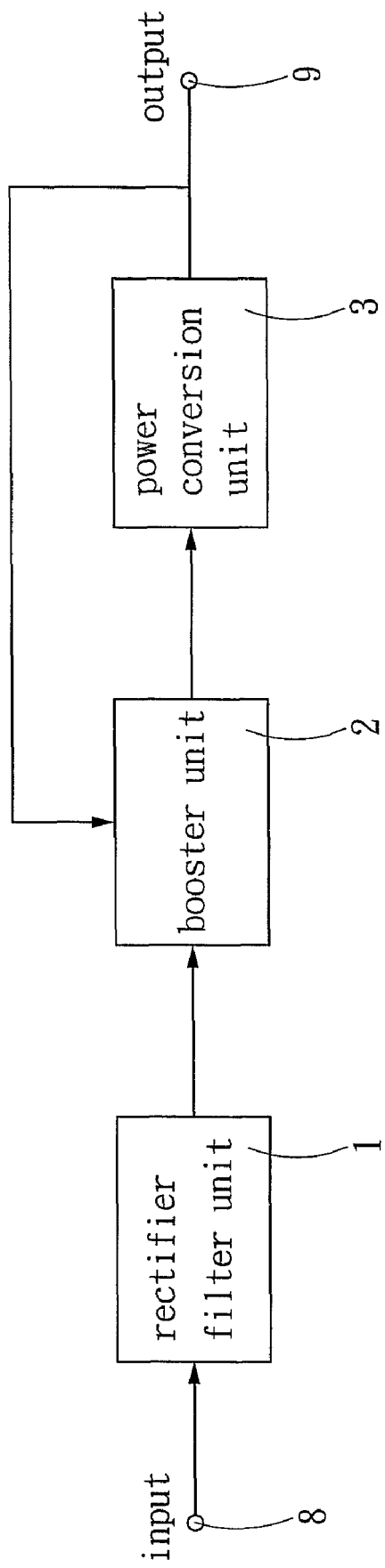
FIG. 1 is a block diagram schematically showing the architecture of a conventional power supply device.
Figure 2:
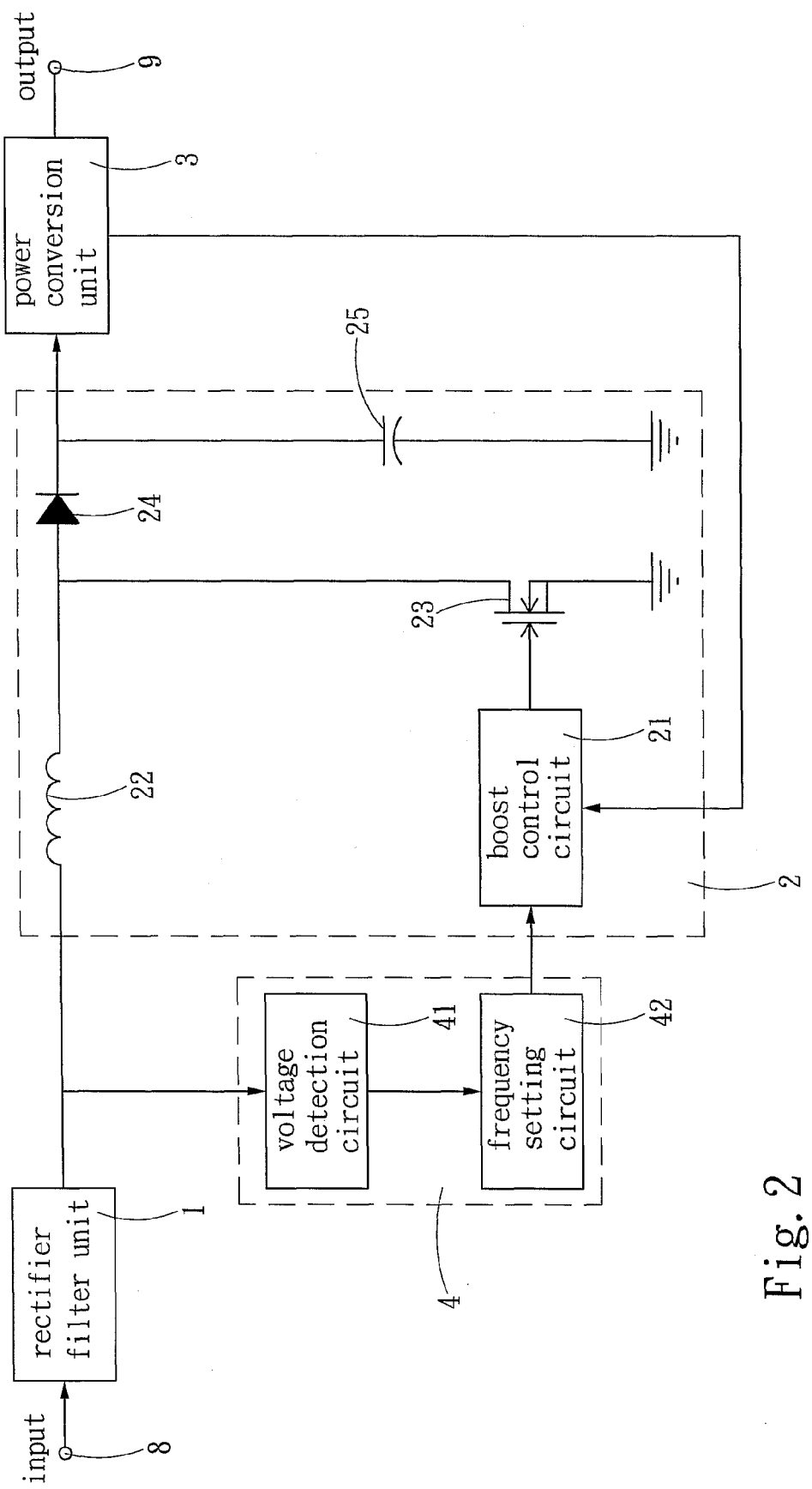
FIG. 2 is a block diagram schematically showing the architecture of an embodiment of the present invention.
Figure 4:
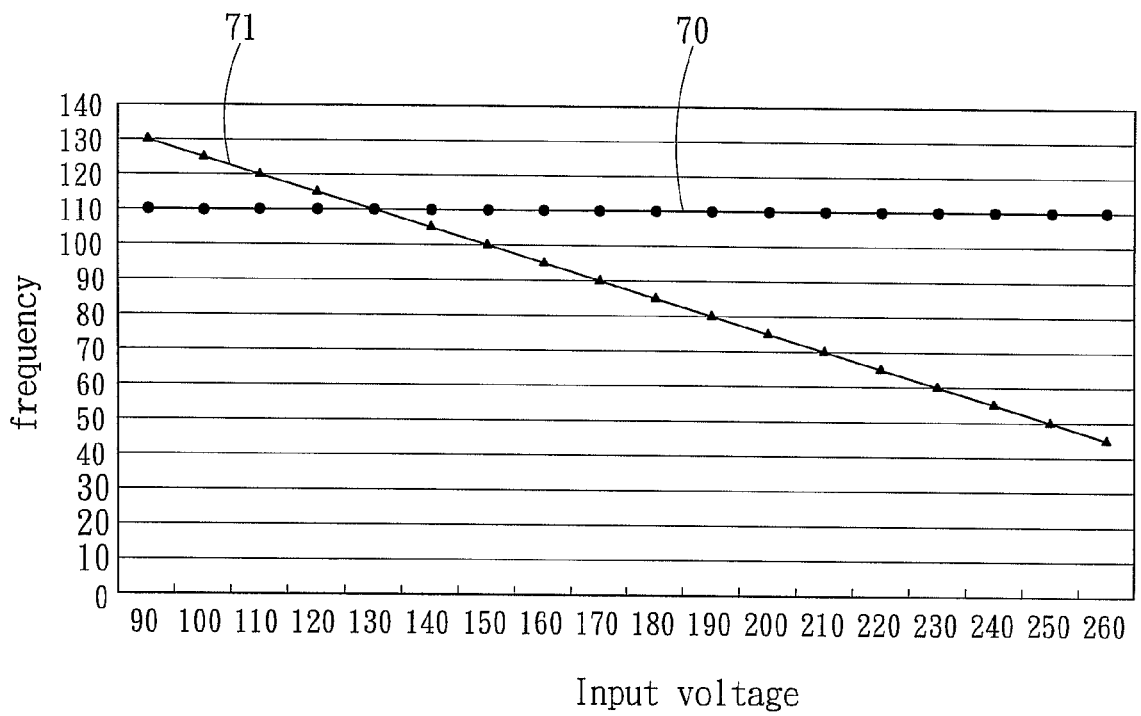
FIG. 4 is a diagram showing the frequency curves of a conventional technology and one embodiment of the present invention.

Refer to FIG. 2. The power supply device comprises: a rectifier filter unit 1, a booster unit 2, and a power conversion unit 3. An input power 8 is received by the power supply device from a power source, processed by the rectifier filter unit 1 and then sent to the booster unit 2. The booster unit 2 further comprises: a boost control circuit 21, and a charge/discharge loop, which is formed of an energy-storage inductor 22, a diode 24 and an energy-storage capacitor 25, and a switch element 23 coupled to the charge/discharge loop. The booster unit 2 modulates the input power 8 in a continuous current mode (CCM) to charge the charge/discharge loop. According to a reference frequency, the boost control circuit 21 generates a pulse signal to control the turn-on interval of the switch element 23 and then control the timing that the input power 8 charges the charge/discharge loop, whereby the input power 8 is boosted and then sent to the power conversion unit 3. Then, the power conversion unit 3 converts the boosted power into an output power 9 driving the load. The boost control circuit 21 receives a feedback signal from the power conversion unit 3 and adjusts the duty ratio of the pulse signal according to the feedback signal. The boost control circuit 21 is coupled to the frequency-changing voltage regulation circuit 4 of the present invention, which comprises: a voltage detection circuit 41 and a frequency setting circuit 42. The voltage detection circuit 41 detects the input power 8 sent to the booster unit 2 and generates an input level signal according to the value of the input power 8. The frequency setting circuit 42 generates a reference frequency signal corresponding to the input level signal and sends the reference frequency signal to the boost control circuit 21 to modulate the frequency that the booster unit 2 performs power conversion. The voltage detection circuit 41 may generate the input level signal linearly proportional to the input power 8. After receiving the input level signal, the frequency setting circuit 42 may generate the reference frequency signal linearly inversely proportional to the input level signal. Refer to FIG. 4 for the curves of the relationships between the input power 8 and the working frequency of the booster unit 2. FIG. 4 includes a conventional frequency curve 70 and a modulated frequency curve 71. The conventional booster unit maintains the boosted power at a constant voltage via adjusting the duty ratio of the pulse signal, and the conventional frequency curve 70 is a horizontal line. Contrarily, the modulated frequency curve 71 is a straight line, wherein the frequency is inversely proportional to the input power 8. When the voltage of the input power 8 rises, the frequency setting circuit 42 will generate a reference frequency signal having a lower frequency, and the booster unit 2 will operate at a lower frequency, whereby the switching loss, harmonics and noise is decreased, and whereby the burden of the booster unit 2 is reduced.

The above-mentioned circuit architecture has another embodiment. In this embodiment, the voltage detection circuit 41 sets a reference value and compares the input power 8 with the reference value and then makes the input level signal have a high level indicating that the input power 8 is higher than the reference value or a low level indicating that the input power 8 is lower than the reference value. The frequency setting circuit 42 sets the reference frequency signal to have a first frequency and a second frequency. When the input level signal has a high level, the reference frequency signal is shifted to the first frequency. When the input level signal has a low level, the reference frequency signal is shifted to the second frequency. Thus, the frequency-changing voltage regulation circuit 4 can provide two different reference frequencies for the booster unit 2, and the first frequency is lower than the second frequency. Thereby, when the voltage of the input power 8 is higher, the booster unit 2 can work at a lower frequency.

Figure 3:
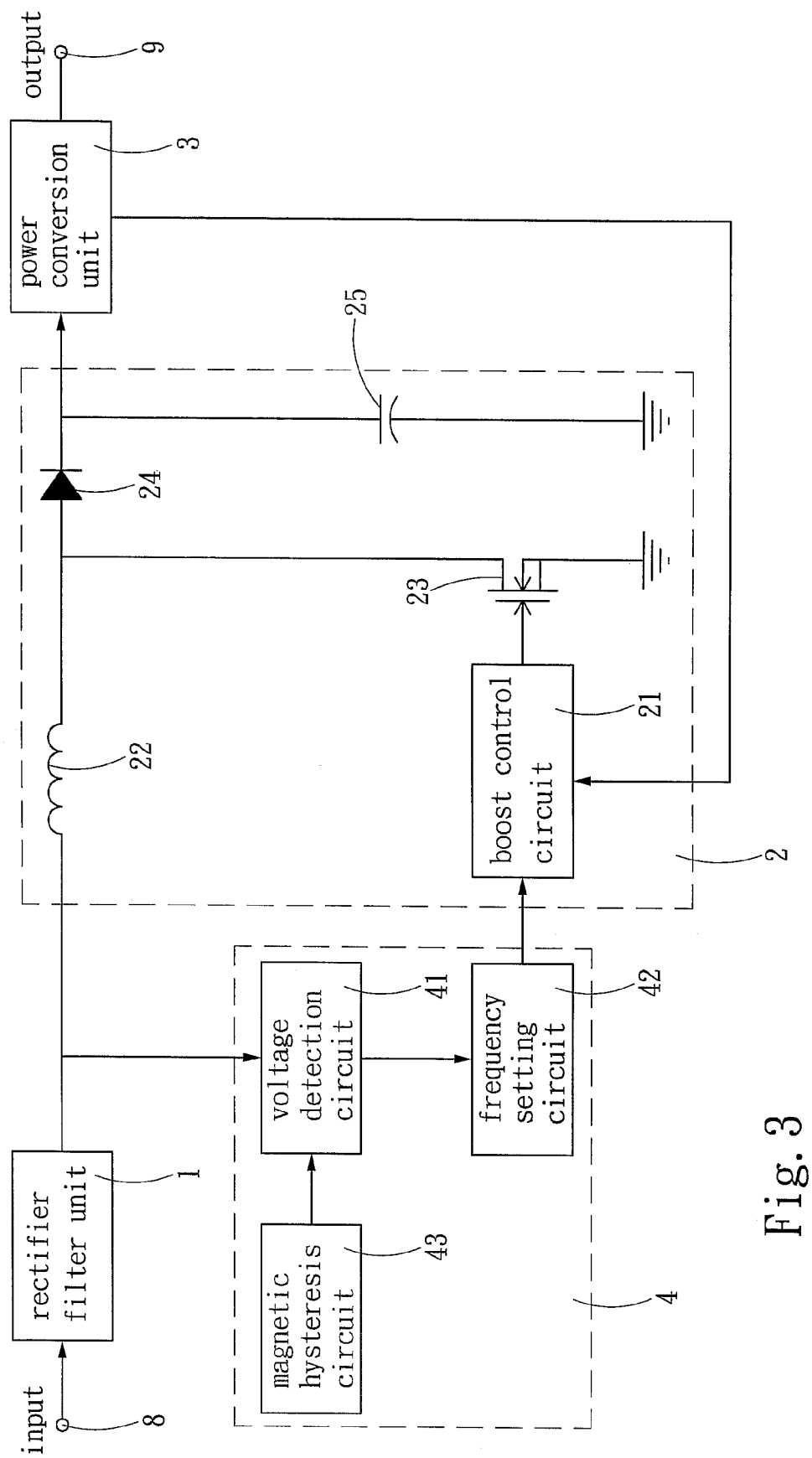
FIG. 3 is a block diagram schematically showing the architecture of a preferred embodiment of the present invention.
Figure 5:
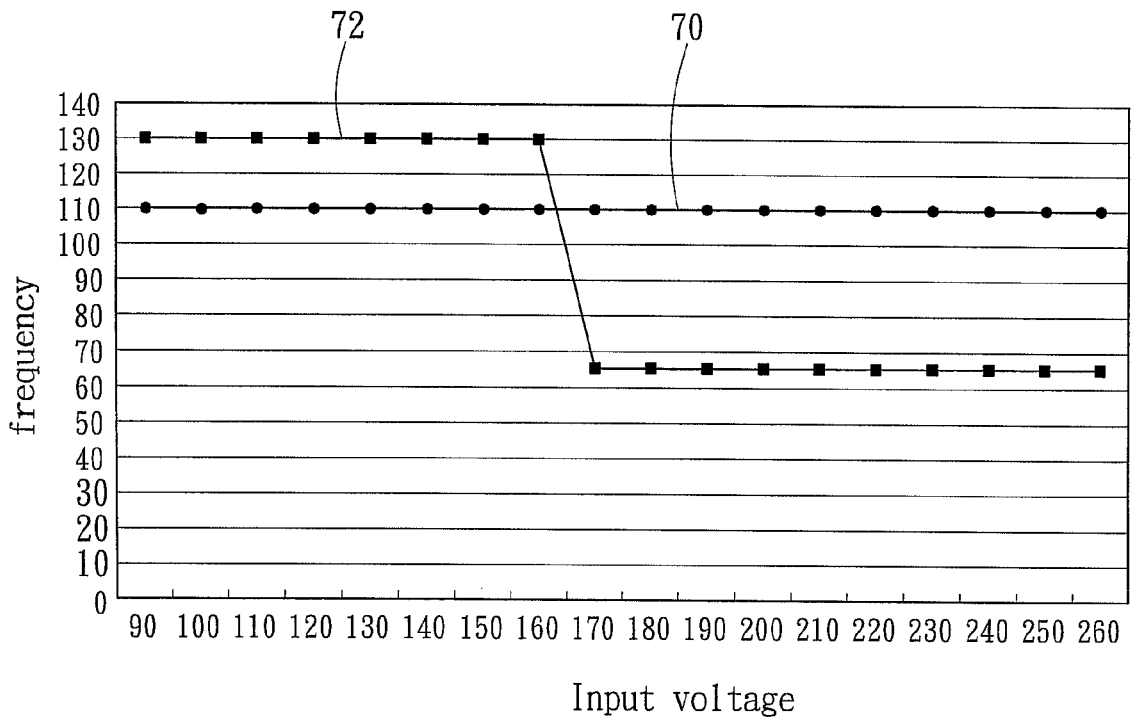
FIG. 5 is a diagram showing the frequency curves of a conventional technology and another embodiment of the present invention.

Refer to FIG. 3. In further embodiment, a magnetic hysteresis circuit 43 is coupled to the voltage detection circuit 41 and generates a buffer voltage to modulate the reference value. The high level of the input level signal triggers an inverse buffer voltage to lower the reference value, and the low level of the input level signal triggers a forward buffer voltage to raise the reference value. Thereby, when the voltage detection circuit 41 sends out a high-level input level signal, the reference value is decreased lest the slight variation of the input power 8 make the frequency change suddenly. Similarly, when the voltage detection circuit 41 sends out a low-level input level signal, the magnetic hysteresis circuit 43 makes the reference value increase to prevent the slight variation of the input power 8 from suddenly changing the frequency. Refer to FIG. 5 for the curves of the relationships between the input power 8 and the working frequency of the booster unit 2 in this embodiment. In FIG. 5, there is also the conventional frequency curve 70, and the modulated frequency curve 72 has a lower first frequency and a higher second frequency. When the voltage of the input power 8 is higher than the preset reference value, the modulated frequency curve 72 is lowered to about 65 KHz. When the voltage of the input power 8 is lower than the preset reference value, the modulated frequency curve 72 is raised to about 130 KHz. Thereby, switching loss, harmonics and noise is decreased, and the burden of the booster unit 2 is reduced.

The preferred embodiments described above are only to exemplify the present invention but not to limit the scope of the present invention. Any equivalent modification or variation according to the spirit of the present invention is to be also included within the scope of the present invention, which is based on the claims stated below.

From the above description are proved that the present invention has improvements over the conventional technology and that the present invention indeed possesses novelty and non-obviousness and meets the condition for a patent. Thus, the inventor files the application for a patent. It will be appreciated if the patent is approved fast.

What is claimed is:

1. A frequency-changing voltage regulation circuit, which applies to a power supply device that has a booster unit and a power conversion unit and is coupled to a power source to obtain an input power, wherein said booster unit has a boost control circuit and operates in a continuous current mode, and wherein said boost control circuit modulates said input power according to a reference frequency to convert said input power into a boosted power, and wherein said boost control circuit is coupled to said frequency-changing voltage regulation circuit, and wherein said frequency-changing voltage regulation circuit comprises:
   a voltage detection circuit, detecting said input power sent to said booster unit and generating an input level signal according to the value of said input power; and
   a frequency setting circuit, generating a reference frequency signal corresponding to said input level signal and sending said reference frequency signal to said boost control circuit to modulate the frequency that said booster unit performs power conversion.

2. The frequency-changing voltage regulation circuit according to claim 1, wherein said voltage detection circuit sets a reference value and compares said reference value with said input power and then makes said input level signal have a high level indicating that said input power is higher than said reference value and a low level indicating that said input power is lower than said reference value.

3. The frequency-changing voltage regulation circuit according to claim 2, wherein said frequency setting circuit sets said reference frequency signal to have a first frequency or a second frequency, and wherein said reference frequency signal is shifted to said first frequency when said input level signal has said high level, and wherein said reference frequency signal is shifted to said second frequency when said input level signal has said low level.

4. The frequency-changing voltage regulation circuit according to claim 3, wherein said first frequency is lower than said second frequency.

5. The frequency-changing voltage regulation circuit according to claim 2, wherein a magnetic hysteresis circuit is coupled to said voltage detection circuit and generates a buffer voltage to modulate said reference value, and wherein said high level of said input level signal triggers an inverse buffer voltage to lower said reference value, and wherein said low level of said input level signal triggers a forward buffer voltage to raise said reference value.

6. The frequency-changing voltage regulation circuit according to claim 1, wherein said input level signal generated by said voltage detection circuit is linearly proportional to said input power.

7. The frequency-changing voltage regulation circuit according to claim 1, wherein said frequency setting circuit makes a frequency of said reference frequency signal linearly inversely proportional to said input level signal.

8. The frequency-changing voltage regulation circuit according to claim 1, wherein in addition to said boost control circuit, said booster unit further comprises: a charge/discharge loop charged by said input power and a switch element coupled to said charge/discharge loop, and wherein said boost control circuit generates a pulse signal to control the turn-on interval of said switch element and then control the timing that said input power charges said charge/discharge loop.

9. The frequency-changing voltage regulation circuit according to claim 8, wherein said boost control circuit receives a feedback signal from said power conversion unit and adjusts a duty ratio of said pulse signal according to said feedback signal.

* * * * *